(12) United States Patent
Tavin

(10) Patent No.: US 12,486,030 B2
(45) Date of Patent: Dec. 2, 2025

(54) VERTICAL TAKE-OFF AND LANDING AERODYNE OPTIMIZED FOR HORIZONTAL FLIGHT

(71) Applicant: Gérard Tavin, Angers (FR)

(72) Inventor: Gérard Tavin, Angers (FR)

( * ) Notice: Subject to any disclaimer, the term of this patent is extended or adjusted under 35 U.S.C. 154(b) by 179 days.

(21) Appl. No.: 18/257,462

(22) PCT Filed: Dec. 10, 2021

(86) PCT No.: PCT/IB2021/061586
§ 371 (c)(1),
(2) Date: Jun. 14, 2023

(87) PCT Pub. No.: WO2022/130151
PCT Pub. Date: Jun. 23, 2022

(65) Prior Publication Data
US 2024/0025540 A1    Jan. 25, 2024

(30) Foreign Application Priority Data
Dec. 14, 2020 (FR) ........................... 2013207

(51) Int. Cl.
*B64C 29/00*     (2006.01)
*B64C 1/30*      (2006.01)
(Continued)

(52) U.S. Cl.
CPC ............ *B64C 29/0025* (2013.01); *B64C 1/30* (2013.01); *B64C 3/56* (2013.01); *B64C 27/30* (2013.01); *B64C 27/12* (2013.01); *B64D 35/024* (2024.01)

(58) Field of Classification Search
CPC ......... B64C 29/0025; B64C 1/30; B64C 3/56; B64C 27/30; B64C 27/12; B64D 35/024; B64D 27/33; B64U 50/33
See application file for complete search history.

(56) References Cited

U.S. PATENT DOCUMENTS 2,487,020 A * 11/1949 Gilerease ................ B64C 27/10
                                                    244/17.11
2,835,458 A *  5/1958 Dorman ............... B64C 29/0033
                                                    416/102
(Continued)

FOREIGN PATENT DOCUMENTS

CN          106428547 A      2/2017
CN          209776067 U     12/2019
(Continued)

OTHER PUBLICATIONS

International Search Report for PCT/IB2021/061586 mailed Apr. 4, 2022, with English Translation, 5 pages.
(Continued)

*Primary Examiner* — Richard Green
*Assistant Examiner* — Nevena Aleksic
(74) *Attorney, Agent, or Firm* — NIXON & VANDERHYE

(57) ABSTRACT

Disclosed is a vertical take-off and landing aerodyne, including a fuselage, two wings, horizontal flight propulsion unit and at least one pair of rotors intended to provide propulsion and lift in the take-off and landing phases. The rotors are retractable and the horizontal flight propulsion unit includes a counter-rotating propeller, situated at the tail of the aerodyne, and a drive unit for rotating the counter-rotating propeller, the counter-rotating propeller being capable of being oriented by a control unit about two axes, one parallel to the yaw axis and the other parallel to the pitch axis of the aerodyne, such that the counter-rotating propeller is used for controlling the attitude of the aerodyne, the latter therefore not having a tail unit.

23 Claims, 15 Drawing Sheets

(51) Int. Cl.
    *B64C 3/56*         (2006.01)
    *B64C 27/12*     (2006.01)
    *B64C 27/30*     (2006.01)
    *B64D 35/024*    (2025.01)

(56) References Cited

U.S. PATENT DOCUMENTS

| | | | | |
|---|---|---|---|---|
| 3,155,341 | A | | 11/1964 | Girard |
| 4,077,202 | A | * | 3/1978 | Schutze ................ B64D 41/00 |
| | | | | 60/788 |
| 5,370,341 | A | * | 12/1994 | Leon ....................... B64C 27/10 |
| | | | | 244/17.11 |
| 7,252,264 | B2 | * | 8/2007 | Nattinger ............... B63H 9/061 |
| | | | | 114/39.21 |
| 10,252,798 | B2 | | 4/2019 | Petrov |
| 10,315,758 | B2 | | 6/2019 | Adam |
| 10,556,679 | B2 | | 2/2020 | Petrov |
| 10,689,105 | B2 | * | 6/2020 | Romo ....................... B64C 3/56 |
| 11,292,588 | B1 | * | 4/2022 | Pope ....................... H02K 7/083 |
| 11,702,202 | B1 | * | 7/2023 | Anderson ............... B64C 27/33 |
| | | | | 244/17.23 |
| 11,801,939 | B2 | * | 10/2023 | Groninga ............... B64D 35/04 |
| 12,071,232 | B2 | * | 8/2024 | Bianco Mengotti ..... B64D 1/06 |
| 2018/0237132 | A1 | * | 8/2018 | Liu ......................... B64U 10/20 |
| 2020/0354050 | A1 | | 11/2020 | Zimenskaya | |

FOREIGN PATENT DOCUMENTS

| | | |
|---|---|---|
| EP | 2669195 A1 | 12/2013 |
| EP | 3335989 A1 | 6/2018 |
| WO | 2017153807 A1 | 9/2017 |

OTHER PUBLICATIONS

Written Opinion of the ISA for PCT/IB2021/061586 mailed Apr. 4, 2022, with English Translation, 17 pages.

FR Search Report and Written Opinion for FR2013207 dated Sep. 17, 2021, with English Translation, 13 pages.

* cited by examiner

[Fig. 1]
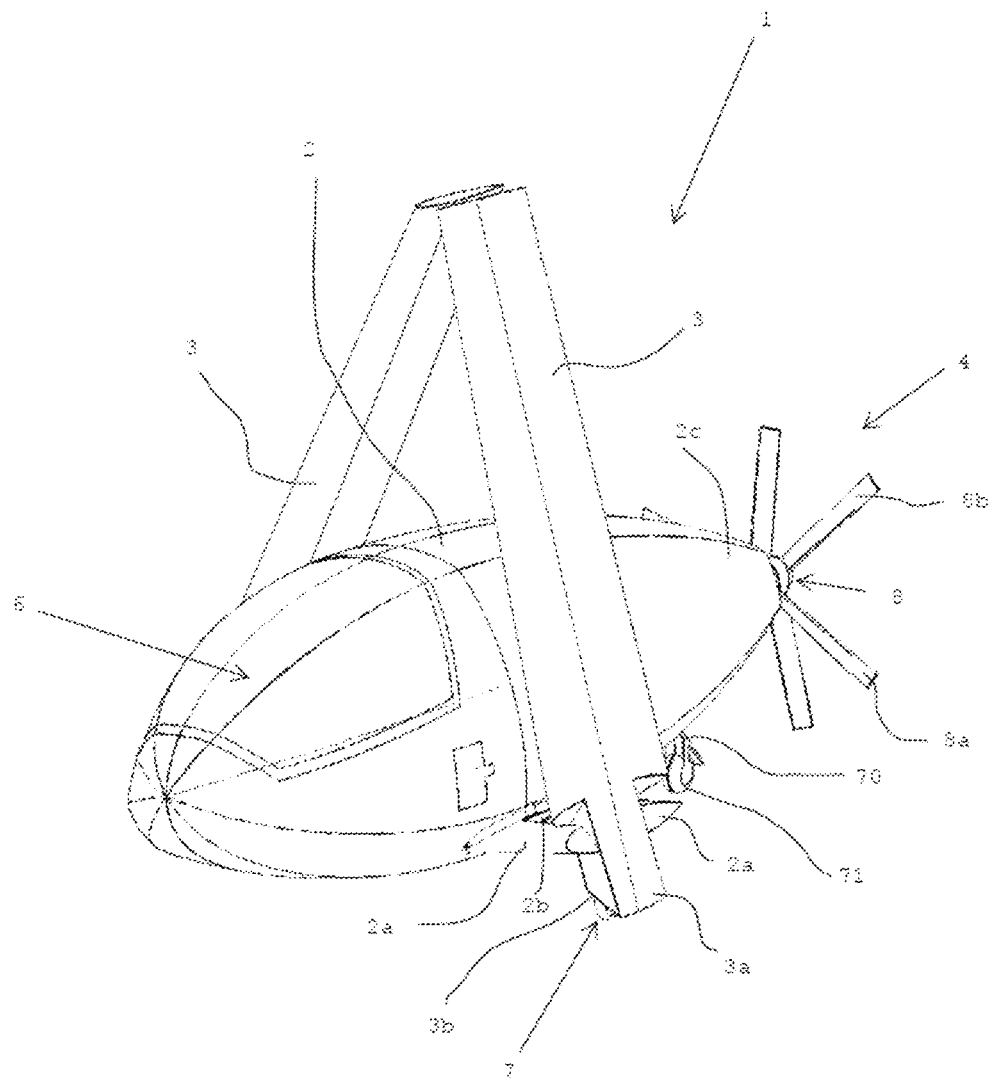

[Fig. 2]
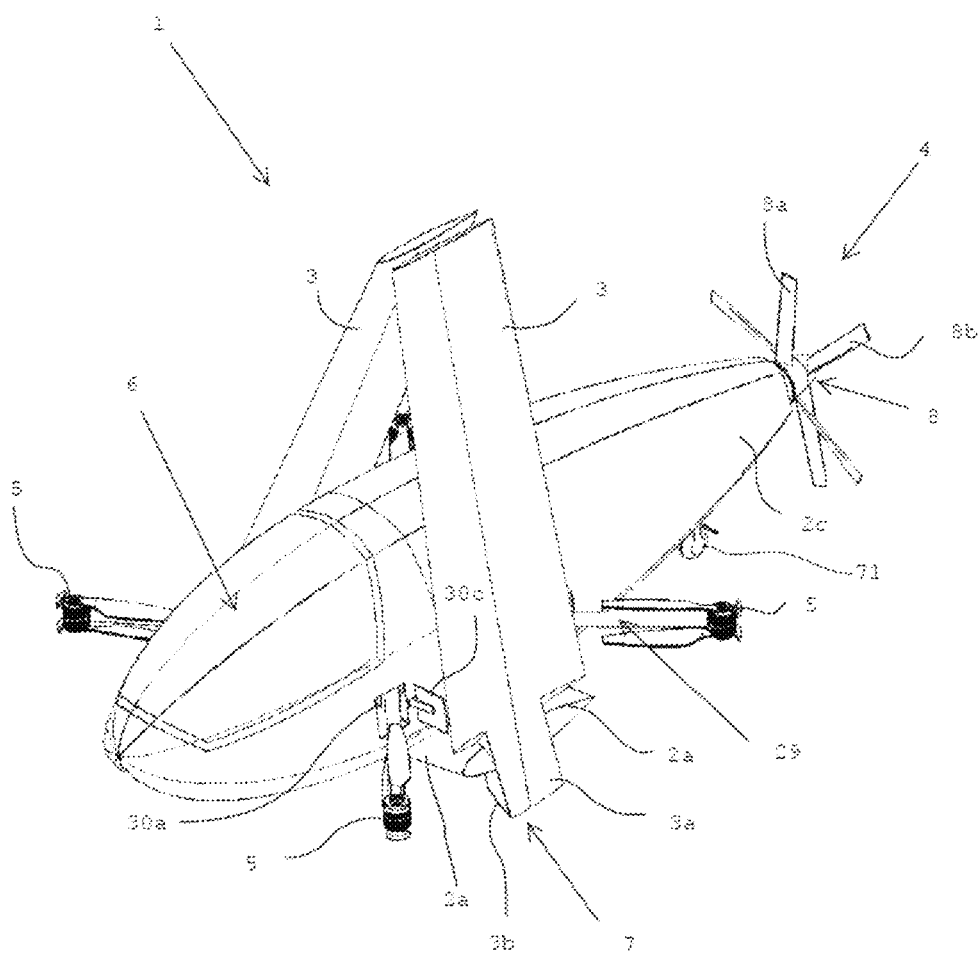

[Fig. 3]
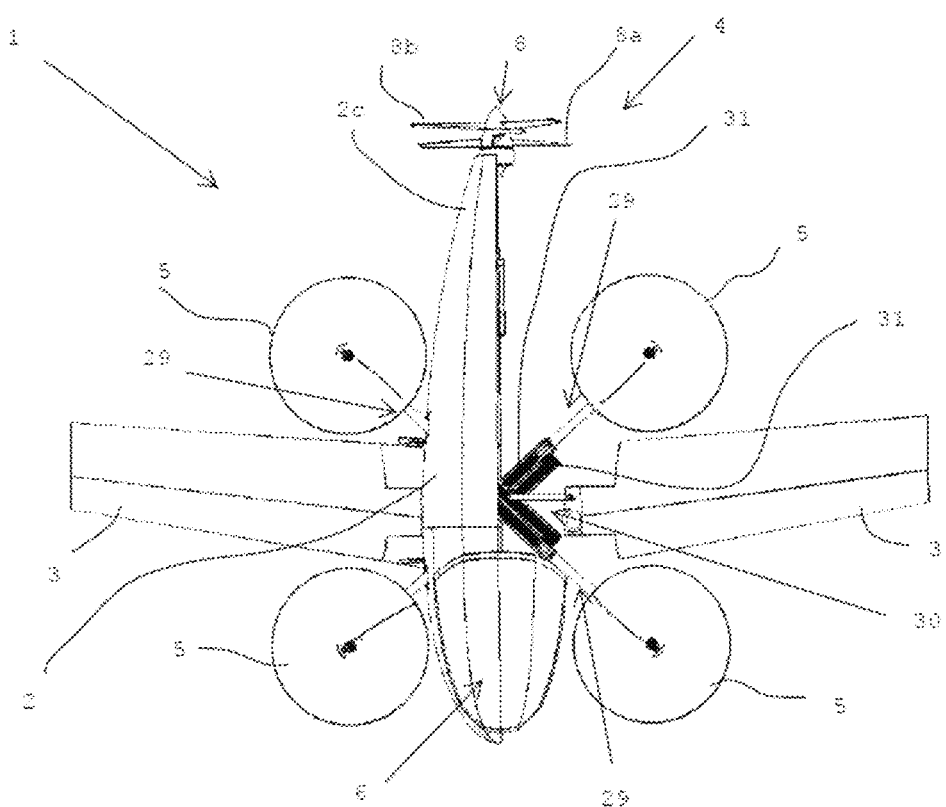

[Fig. 4]
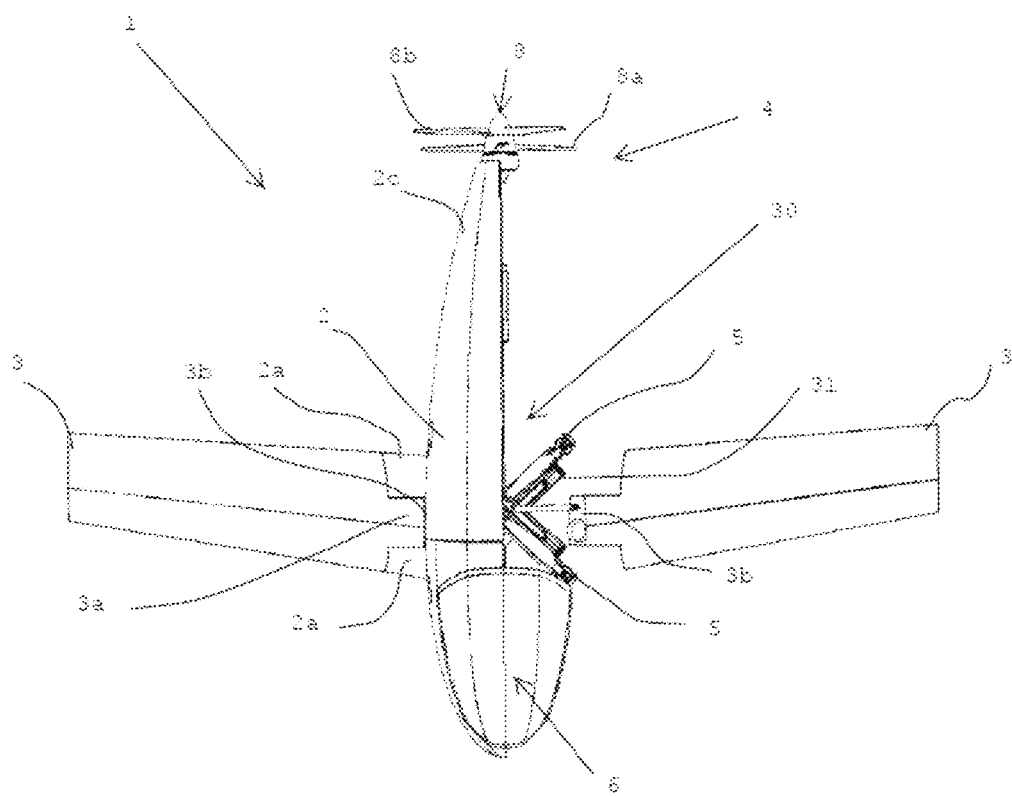

[Fig. 5]
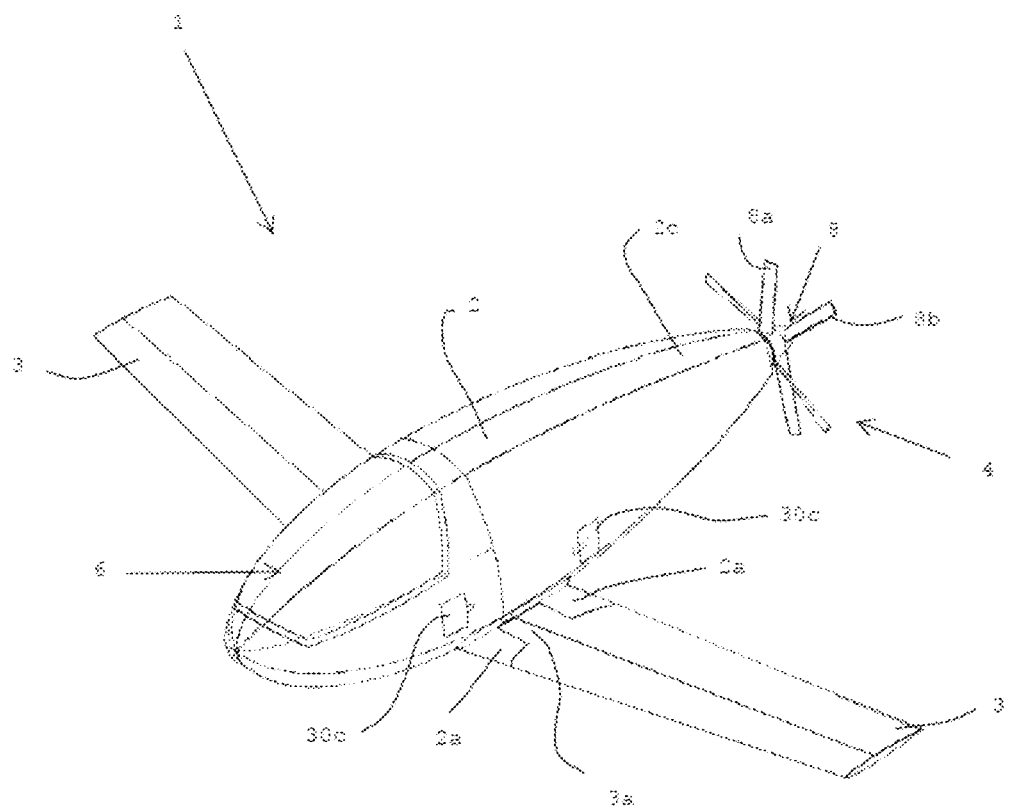

[Fig. 6]
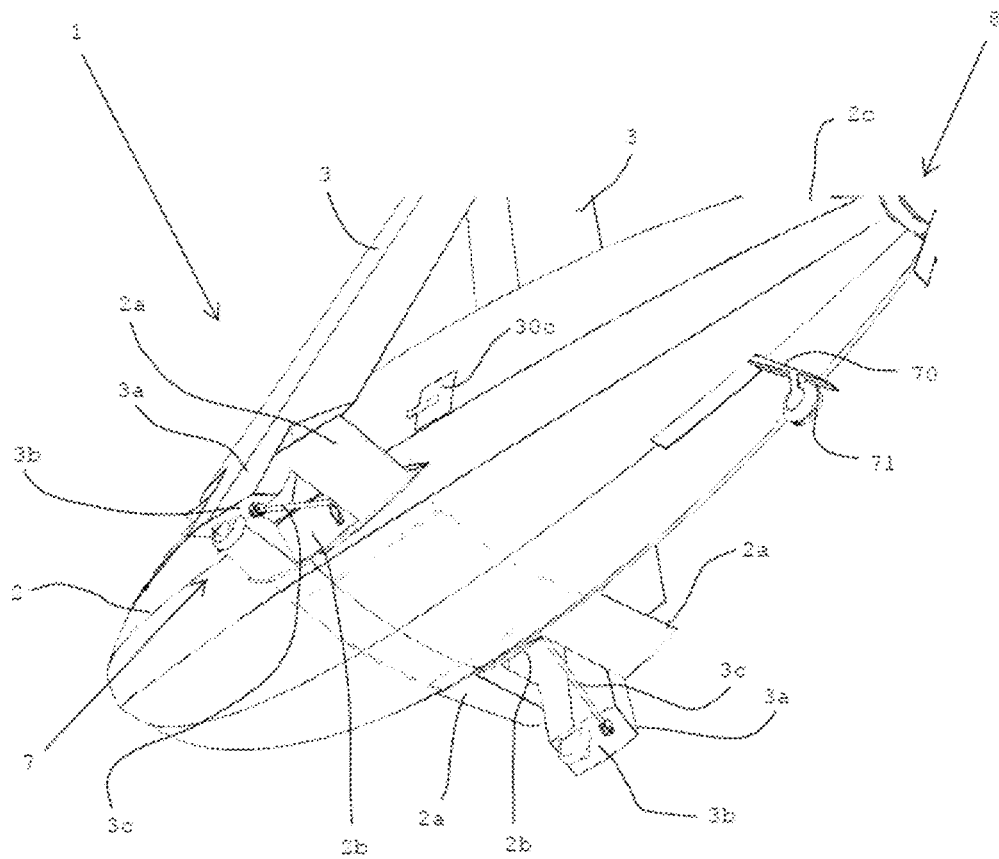

[Fig. 7]
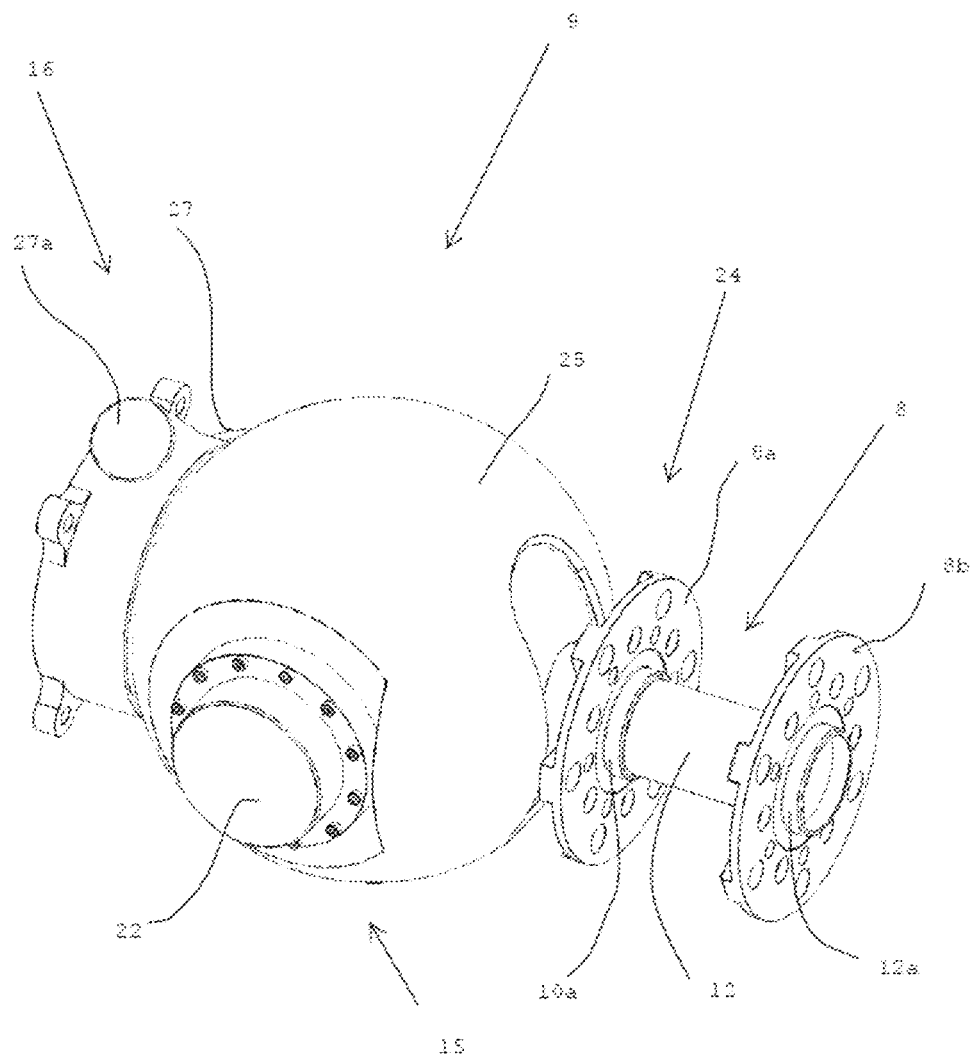

[Fig. 8]
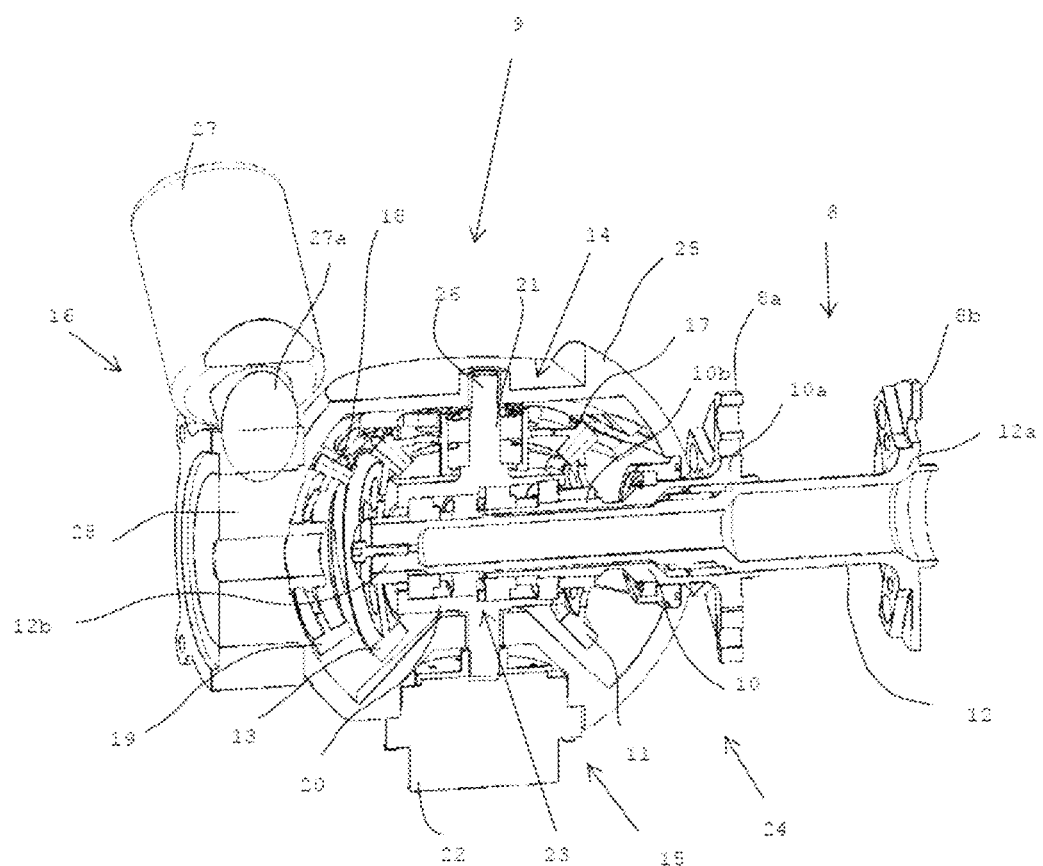

[Fig. 9]
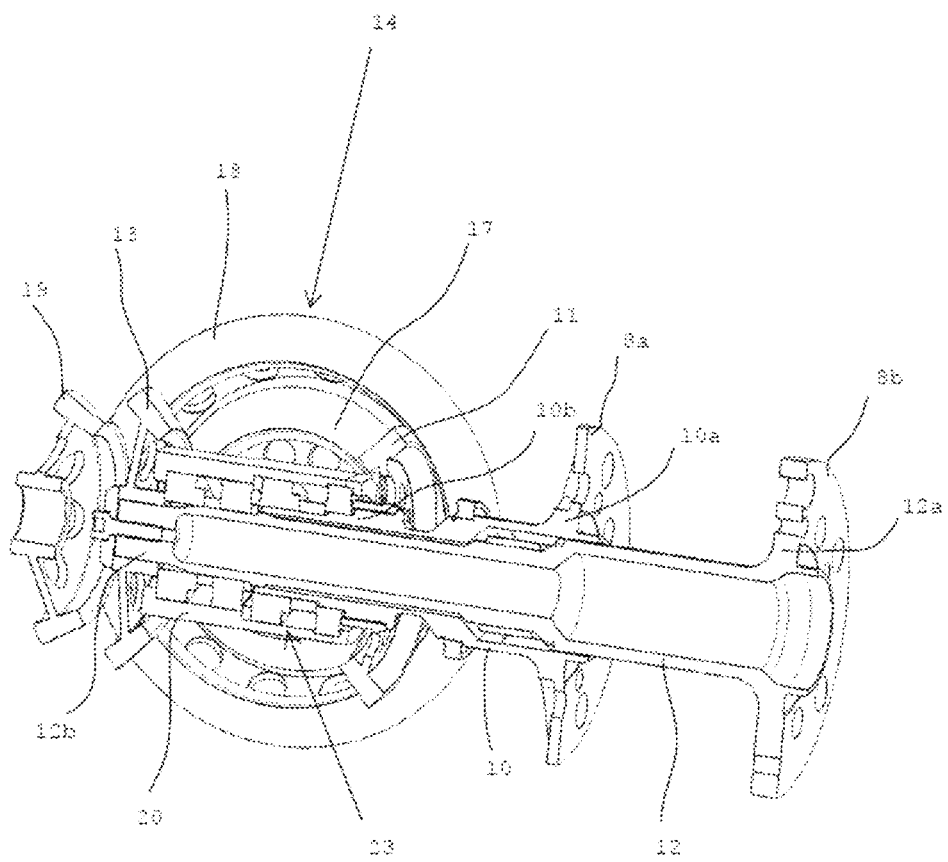

[Fig. 10]
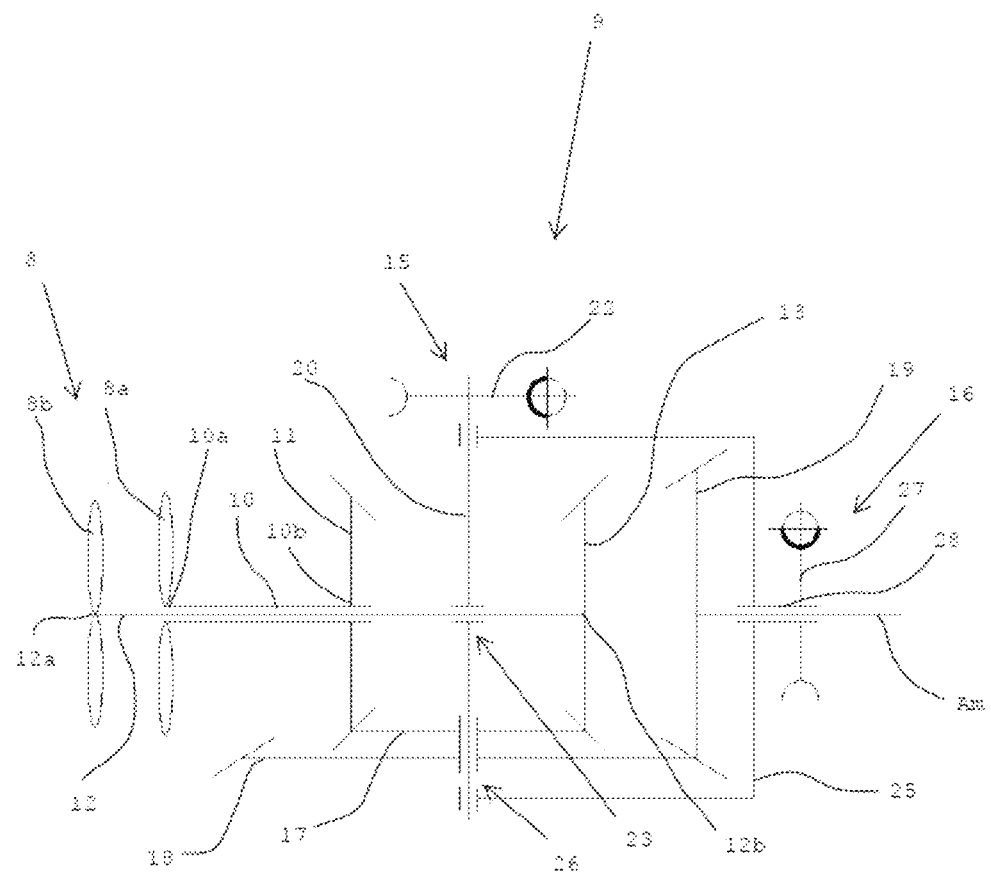

[Fig. 11]
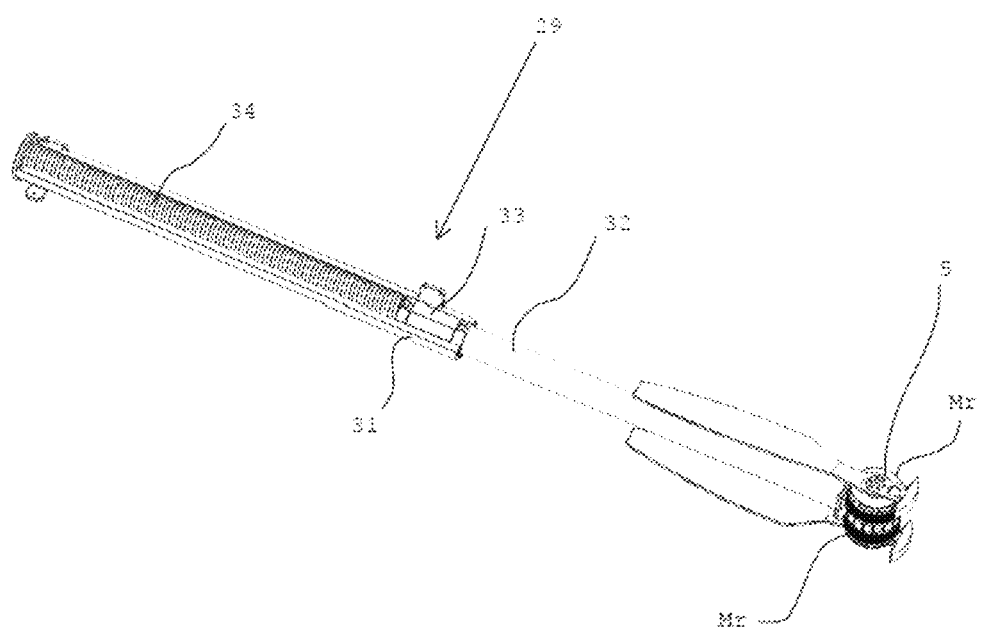

[Fig. 12]
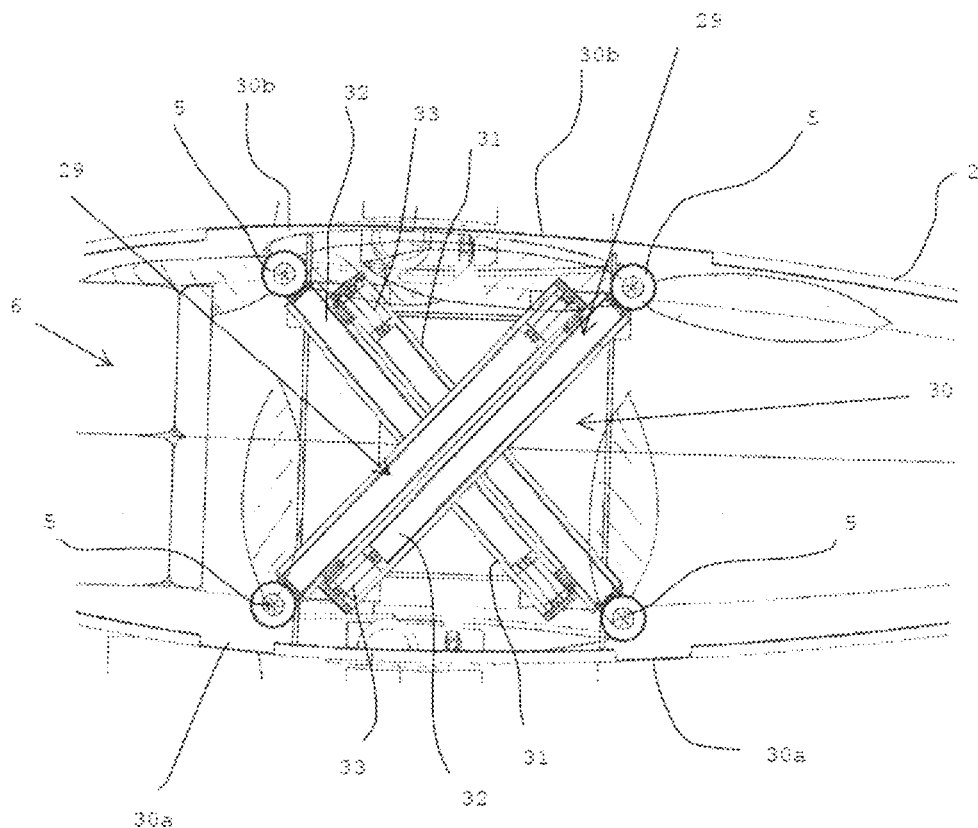
[Fig. 13a]
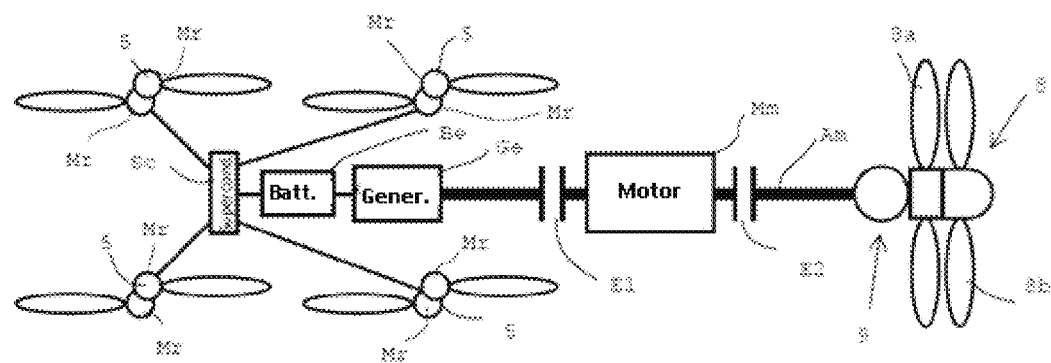

[Fig. 13b]
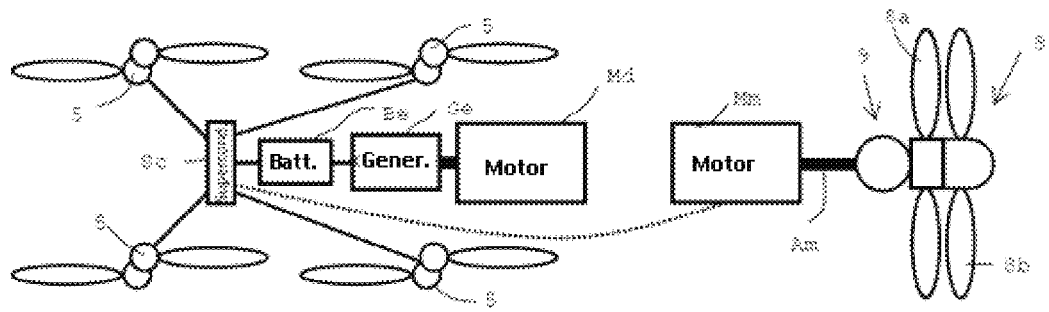
[Fig. 13c]
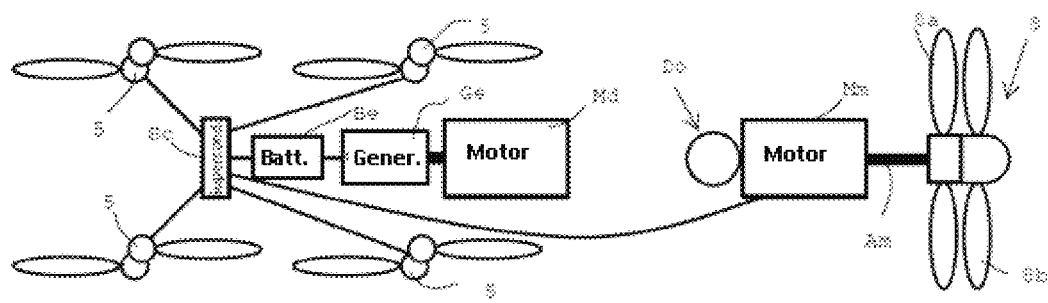
[Fig. 13d]
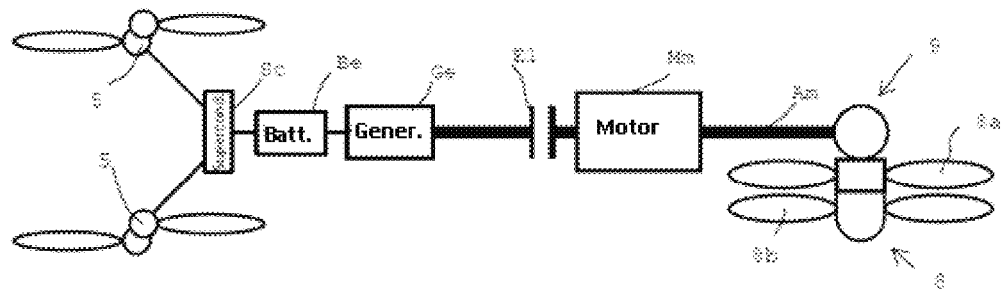

[Fig. 14]
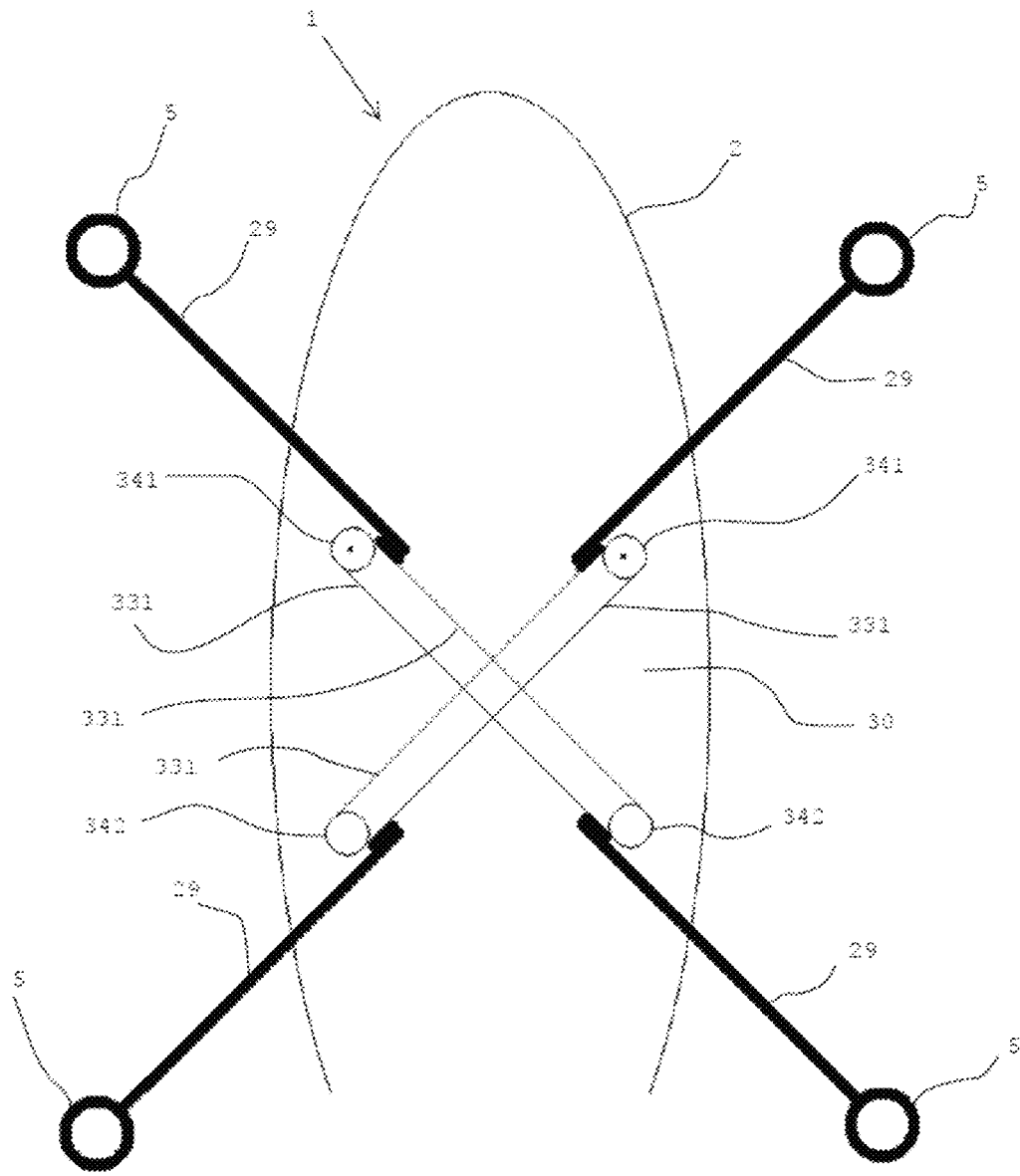

[Fig. 15]
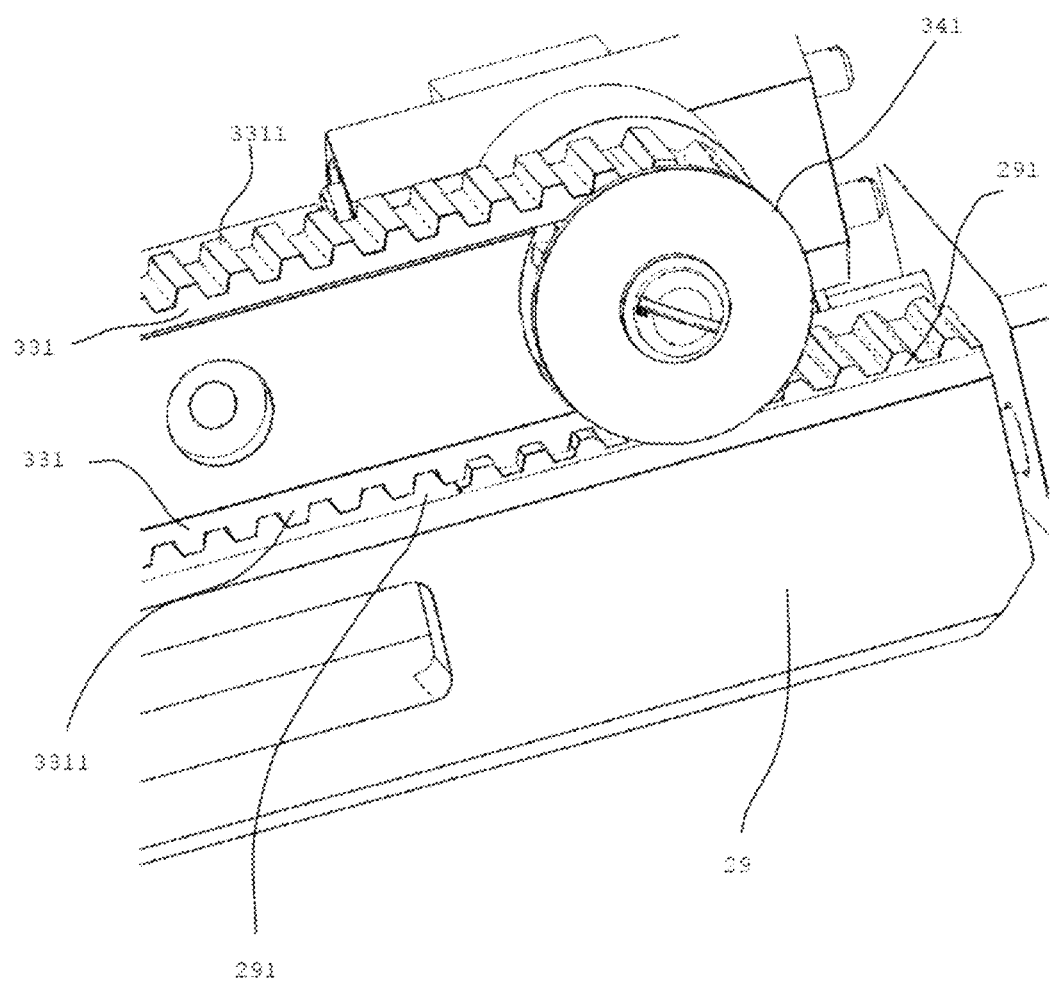

VERTICAL TAKE-OFF AND LANDING AERODYNE OPTIMIZED FOR HORIZONTAL FLIGHT

CROSS-REFERENCE TO RELATED APPLICATIONS

This application is the U.S. national phase of International Application No. PCT/IB2021/061586 filed Dec. 10, 2021, which designated the U.S. and claims priority to FR 2013207 filed Dec. 14, 2020, the entire contents of each incorporated herein by reference.

BACKGROUND OF THE INVENTION

Field of the Invention

The present invention relates to the technical field of vertical take-off and landing aircrafts, and more particularly to a vertical take-off and landing aerodyne optimized for horizontal flight.

Description of the Related Art

Vertical take-off and landing aircrafts (VTOL) have been under development for many years. A wide variety of technical solutions have been proposed, such as the use of vertical rotors integrated into the wing or fuselage, the use of pivoting wings carrying rotors for vertical take-off/landing and then propulsion in horizontal flight, or the use of dedicated arms carrying rotors in the manner of UAVs.

However, the technical solutions proposed in the prior art have their drawbacks.

U.S. Pat. Nos. 10,252,798 B2 and 10,556,679 B2 both describe an aerodyne having wings that can be folded into positions parallel to the fuselage and carrying propeller engines on their leading edges and optionally wheels on their trailing edges, to facilitate ground travel. In the folded position, the wings enable vertical take-off, then, during a transition phase, the wings pivot around an axis of rotation that is non-perpendicular and transverse to the longitudinal axis of the fuselage, to enable horizontal flight. However, this solution requires the use of propeller engines on the wings, which generates noise pollution for the aircraft's occupants and degrades the aircraft's aerodynamism in horizontal flight.

European patent application EP 3,335,989 A1 discloses a VTOL-type fixed-wing aerodyne comprising four arms provided with rotors, and propelled in horizontal flight by a single rear propeller. In horizontal flight, the arms are folded by pivoting into housings on the sides of the fuselage, and doors close the housings. This solution reduces friction and thus improves the aircraft's aerodynamism in horizontal flight. However, the fixed-wing design requires a large landing area, making the aerodyne difficult to use in an urban environment, and the single rear propeller means that horizontal stabilizers and a vertical stabilizer have to be fitted to the aircraft's tail to ensure stability in horizontal flight.

As a result, the solutions of the prior art proposed for vertical take-off and landing aircrafts still have their drawbacks, whether in terms of the space required for landing or aerodynamism in horizontal flight.

SUMMARY OF THE INVENTION

The aim of the present invention is thus to provide a solution to the problem of having a vertical take-off and landing aerodyne that is aerodynamically similar or superior to conventional fixed-wing aircrafts, and that is sufficiently compact in size during the take-off, landing and taxiing phases to enable it to be used in environments, particularly urban ones, where landing areas are restricted in size.

According to the present invention, this solution is based on the use, on the one hand, of rotors for the take-off and landing phases that can be retracted into the fuselage of the aerodyne during horizontal flight, and, on the other hand, of a counter-rotating propeller both as a means of propulsion in horizontal flight and as a means for steering the aerodyne.

It is emphasized here that the solution according to the present invention applies to both manned and unmanned aerodynes, or drones, although the advantages provided by the present invention, and which will be detailed below, will be fully expressed for a manned aerodyne.

Thus, the present invention relates to a vertical take-off and landing aerodyne, comprising a fuselage, two wings intended to provide lift in horizontal flight, direction and fore-and-aft control means, horizontal flight propulsion means and at least one pair of rotors intended to provide propulsion and lift in the take-off and landing phases, the aerodyne being characterized in that:

the rotors are retractable, each rotor being carried by an arm movable between an extended position, in which the rotor is located on a respective side of the fuselage, with its axis of rotation being vertical, the two rotors of the same pair being symmetrical in relation to the longitudinal axis of the fuselage, and a retracted position, in which the arm and the respective rotor are received in a housing of the fuselage; and the horizontal flight propulsion means comprise a counter-rotating propeller, located at the tail of the aerodyne, and drive means for driving the counter-rotating propeller in rotation, the counter-rotating propeller being capable of being oriented by the control means about two axes, one parallel to the yaw axis and the other parallel to the pitch axis of the aerodyne, so that the counter-rotating propeller is used for steering the aerodyne, the latter thus having no tail unit.

In extended position, the retractable rotors, possibly in combination with the counter-rotating propeller, enable vertical take-offs and landings, and their ability to retract means that they do not affect the aerodyne's aerodynamic performance in horizontal flight.

As mentioned above, the ability to orientate the counter-rotating propeller along two axes enables the aerodyne to be steered and stabilized during horizontal flight phases, thus dispensing with the need for a tail unit and eliminating the aerodynamic friction and additional weight associated with this element, further improving the aerodyne's aerodynamic performance in horizontal flight.

According to a particular embodiment, the drive means comprise motor means and a drive shaft adapted to be driven in rotation by the motor means, and the counter-rotating propeller is connected to the drive shaft by a pin spherical joint, the center of which is the intersection of the longitudinal axis of the drive shaft and the axis of rotation of the counter-rotating propeller, and the axis of which is the axis of rotation of the counter-rotating propeller.

In this particular embodiment, the contra-rotating propeller can preferably comprise a first propeller secured to a first hollow transmission shaft, open at both ends thereof, the first propeller being located at one end of the first transmission shaft, the other end of the latter being secured to a first bevel gear, and a second propeller secured to a second transmission shaft extending through the first transmission shaft and protruding at each of the two ends of the latter, the second propeller being located at one end of the second transmission shaft, the other end of the latter being secured to a second bevel gear, and the pin spherical joint comprises:

transmission means for transmitting the rotation of the drive shaft to the first and second bevel gears, comprising a bevel gear called drive gear, the axis of rotation of which is perpendicular to the axis of rotation of the first and second bevel gears, the latter meshing with the drive gear;

first orientation means capable of pivoting the contra-rotating propeller about a first pivot axis coinciding with the axis of rotation of the drive gear, the first orientation means forming, together with said transmission means and the contra-rotating propeller, an assembly called mobile assembly; and second orientation means capable of rotating the mobile assembly about the axis of rotation of the drive shaft, the first and second orientation means being slaved to the direction and fore-and-aft control means.

The above configuration offers the possibility of a simple implementation for the contra-rotation and orientation of the propeller.

Thus, the first orientation means may advantageously comprise:

a yoke in the form of a casing located between the first and second gears and surrounding the end regions of the first and second transmission shafts, and being connected to the latter by a pivot connection allowing only a relative rotation between the yoke and the counter-rotating propeller about the axis of rotation of the latter;

a first trunnion integral with the yoke, extending from one side thereof and around which the drive gear is rotatably mounted, the longitudinal axis of the first trunnion coinciding with the first pivot axis; and a first rotary actuator located on the side of the yoke opposite that on which the drive gear is located, the actuator being connected to the yoke so as to be able to rotate it about the axis of the first trunnion, and thus to pivot the counter-rotating propeller about the first pivot axis, the first actuator being slaved to the direction and fore-and-aft control means.

Preferably, the first actuator comprises a strain wave reduction gear. This has the advantages of very low backlash, high transmission ratios with compact dimensions and low weight, as well as high transmissible torque.

Advantageously, the transmission means for transmitting the rotation of the drive shaft to the first and second bevel gears may further comprise a bevel ring gear, called drive ring gear, which is secured to the drive gear, coaxial therewith and of a larger diameter than the latter, and a bevel gear, called input gear, which is secured the drive shaft and meshes with the drive ring gear, and the second orientation means comprise a mobile frame to which the first trunnion is connected by a pivot connection allowing only the rotation of the trunnion about its longitudinal axis, and a second actuator capable of rotating the frame about the axis of rotation of the drive shaft, the second actuator being slaved to the direction and fore-and-aft control means.

The second actuator can be an axial worm gear actuator engaged with a ring gear surrounding the drive shaft and secured to the frame.

The above features of the counter-rotating propeller, the propeller drive means and the pin spherical joint all contribute to a solution that is very compact and light in weight, while providing precise and responsive control of the counter-rotating propeller's orientation, and therefore of the aerodyne's steering.

With regard to the rotors, in a first particular embodiment, the aerodyne comprises a single pair of rotors, the counter-rotating propeller then being intended to be placed, in the take-off and landing phases, vertically so as to produce an upward thrust, the aerodyne then corresponding, in the take-off and landing phases, to a tricopter, the rotors preferably being towards the front of the fuselage in the extended position.

The capability of orienting the counter-rotating propeller downwards means that only one pair of rotors may be provided, thus saving weight on the aerodyne.

In a second particular embodiment related to the rotors, the aerodyne comprises two pairs of rotors such that, in the extended position, two rotors are located on each side of the fuselage, said two rotors being spaced apart from each other in the longitudinal direction of the fuselage, the aerodyne then corresponding, in the take-off and landing phases, to a quadcopter.

The two pairs of rotors increase the aerodyne's stability during the take-off and landing phases.

Each arm carrying a rotor may be able to pivot between the extended position and the retracted position.

Preferably, each arm carrying a rotor is a retractable arm able to slide between the extended position and the retracted position. The use of retractable arm(s) frees up space for the cockpit, and also makes it possible to provide side doors in the fuselage, which would not be possible with pivoting arms.

Even more advantageously, the aerodyne comprises two pairs of retractable rotors, each retractable arm being able to slide along at least one guide rail arranged in a housing of the fuselage, the guide rails being arranged crosswise, preferably each at an angle of 45° relative to the longitudinal axis of the fuselage.

Preferably, each retractable arm is a tubular arm whose end opposite that carrying the rotor carries a nut surrounding a motorized screw, preferably a hollow screw the motorization of which is located inside the screw, the motorized screw extending along the at least one guide rail and inside the tubular arm, so as to control the translation of the tubular arm between the extended and retracted positions.

This technical solution improves the compactness of the retraction system in order to limit the space requirement induced in the fuselage of the aerodyne, in particular to such an extent that the aerodyne according to the present invention can be a manned aerodyne comprising a cockpit.

According to an alternative embodiment, each retractable arm is engaged, at the end opposite that carrying the rotor, with a force transmission element, each force transmission element being operatively connected to a motor assembly, the actuation of which controls the movement of the force transmission element and thus the sliding of the retractable arm between the extended and retracted positions.

Preferably, each force transmission element is secured to two retractable arms.

In particular, this technical solution makes it possible to use a single motor assembly to simultaneously maneuver at least two retractable arms between the extended and retracted positions.

Preferably, each force transmission element is a belt carrying on the outside, for each retractable arm with which the belt is engaged, an external toothing meshing with a complementary toothing carried by the respective retractable arm, such that the engagement between the retractable arm and the belt is a meshing engagement, the two strands of the belt being parallel to the longitudinal direction of the respective retractable arm(s).

Each rotor may comprise a two-blade or single-blade propeller.

In a preferred variant, each rotor comprises two counter-rotating single-blade propellers having the same axis of rotation, which is parallel to the yaw axis of the aerodyne, each propeller being driven in rotation by a dedicated electric motor. In combination with the configuration of two pairs of retractable rotors, this offers safety in the event of failure of one or more of the motors. With the same safety objective in mind, the pitch of these propellers can be set to its autorotation value. In the event of a motor power failure, the aerodyne's descent is thus cushioned, while scavenging energy for use in the final landing phase. A "wind turbine" mode can also be used, by reversing the direction of rotation of the rotors during descent, also enabling energy scavenging.

Each rotor may be driven in rotation by a dedicated electric motor also carried by the respective arm, the electric motors being powered by a common electric generator located in the fuselage and driven by a heat engine, preferably with an electric battery and supercapacitors in series between the electric generator and the electric motors. The supercapacitors enable high current to be delivered to the motors, which is more suited to practical requirements for the take-off and landing phases.

The heat engine may be dedicated to the generator.

Alternatively, the heat engine may serve both to drive the electric generator and to rotate the counter-rotating propeller, in which case a clutch is interposed between the heat engine and the electric generator and, in the event that the aerodyne comprises more than one pair of rotors, between the heat engine and the counter-rotating propeller.

Particularly advantageously, the wings are foldable, such that they can be folded upwards for the take-off and landing phases.

It's easy to see that folding the wings during the take-off and landing phases reduces the aerodyne's overall dimensions, making it easier to use in environments, particularly urban ones, where landing areas are limited in size.

Preferably, each wing is provided with a landing gear at its wing root end, which is the lower end in the folded position, the landing gear being optionally retractable.

Each wing can be advantageously connected to the fuselage at said wing root end, which extends between two support arms secured to the fuselage and is connected to each of them by a pivot connection the axis of which is parallel to the longitudinal axis of the fuselage, said wing root end terminating in an end surface whose shape is complementary to the shape of the fuselage region opposite which said end surface is located in the unfolded position of the wing, in horizontal flight. These complementary shapes allow the wings to be folded while limiting aerodynamic friction at the junctions between the wings and the fuselage in the unfolded position.

According to a first further aspect of the present disclosure, there is disclosed a vertical take-off and landing aerodyne, comprising a fuselage, two wings intended to provide lift in horizontal flight, direction and fore-and-aft control means, horizontal flight propulsion means and at least one rotor intended to provide propulsion and lift in the take-off and landing phases, the wings being foldable so as to be capable of being folded upwards for the take-off and landing phases, the aerodyne being characterized in that each wing is provided with a landing gear, at its wing root end, which is the lower end in the folded position, the landing gear being optionally retractable. In this way, landing gear deployment results directly from simply folding the wings upwards, without the need for any additional controls, for simplicity of design, manufacture, use and weight.

According to a second aspect of the present disclosure, there is disclosed a vertical take-off and landing aerodyne, comprising a fuselage, two wings intended to provide lift in horizontal flight, direction and fore-and-aft control means, horizontal flight propulsion means and at least one pair of rotors intended to provide propulsion and lift in the take-off and landing phases, the aerodyne being characterized in that the rotors are retractable, each rotor being carried by an arm which can be moved between an extended position, in which the rotor is located on a respective side of the fuselage, with its axis of rotation being vertical, the two rotors of the same pair being symmetrical in relation to the longitudinal axis of the fuselage, and a retracted position, in which the arm and the respective rotor are received in a housing of the fuselage, and each arm carrying a rotor is a retractable arm able to slide, in translation, between the extended position and the retracted position. The use of retractable arm(s) frees up space for the cockpit, and also enables side doors to be provided in the fuselage, which would not be possible with pivoting arms.

It is emphasized that the features and advantages described above and hereinafter in connection with the present invention can also be combined with aerodynes according to the first and second further aspects of the present disclosure described above.

BRIEF DESCRIPTION OF THE DRAWINGS

A particular embodiment of the present invention will now be described, by way of a non-limiting example, with reference to the appended drawings.

On these drawings:

FIG. 1 is a perspective view of the aerodyne according to one embodiment of the present invention, in the parked state, in which the wings are folded upwards, the rotors are retracted into the fuselage and the rear stand is extended.

FIG. 2 is a perspective view of the aerodyne in the take-off phase, in which the wings are folded upwards and the rotors are extended and rotating.

FIG. 3 is a top view of the aerodyne in the transition phase from vertical take-off to horizontal flight, in which the wings are unfolded, the rotors are extended and rotating, and the counter-rotating propeller is rotating, the left fuselage section (as seen in the direction of travel of the aerodyne) being not shown to reveal the arms carrying the rotors and their housings.

FIG. 4 is a top view of the aerodyne in horizontal flight, in which the wings are unfolded, the rotors are retracted and the counter-rotating propeller is rotating, the left fuselage section being not shown to reveal the arms carrying the rotors and their housings.

FIG. 5 is a perspective view of the aerodyne in horizontal flight.

FIG. 6 is a detail view of the connection between a wing and the fuselage of the aerodyne.

FIG. 7 is a perspective view of the pin spherical joint connecting the counter-rotating propeller to the drive shaft of the aerodyne according to the first embodiment.

FIG. 8 is a cross-sectional view of said pin spherical joint.

FIG. 9 is a cross-sectional view of the transmission means.

FIG. 10 is a kinematic diagram of the pin spherical joint connecting the counter-rotating propeller to the drive shaft of the aerodyne according to the first embodiment.

FIG. 11 is a detail view of a retractable arm and a rotor.

FIG. 12 is a schematic view of the housing of the fuselage showing, for explanatory purposes only, two-blade propeller rotors on one side and single-blade propeller rotors on the other, after they are retracted.

FIG. 13a is a schematic representation of a first example of aerodyne motorization.

FIG. 13b is a schematic representation of a second example of aerodyne motorization.

FIG. 13c is a schematic representation of a third example of aerodyne motorization.

FIG. 13d is a schematic representation of a fourth example of aerodyne motorization.

FIG. 14 is a schematic representation of the housing of the fuselage and retractable arms according to an alternative embodiment.

FIG. 15 is a detail view of the connection between a retractable arm and a force transmission element according to an example of the embodiment shown in FIG. 14.

DETAILED DESCRIPTION

Referring first to FIGS. 1 to 6, it can be noted that the aerodyne according to a first embodiment of the present invention is a vertical take-off and landing type aerodyne 1 comprising a fuselage 2, two wings 3 intended to provide lift in horizontal flight, direction and fore-and-aft control means, horizontal flight propulsion means 4 and rotors 5 capable of providing propulsion and lift in the take-off and landing phases.

The fuselage 2 is itself a conventional fuselage, extending along a longitudinal axis of the aerodyne, and accommodating a cockpit 6 for transporting people and goods.

It should be pointed out that the fuselage 2 is not equipped with a tail unit, which is made possible by the design of the aerodyne 1 and its propulsion means, as will be described below.

The wings 3 are provided on either side of the fuselage 2 and are intended to provide lift for the aerodyne 1 in horizontal flight, as well as to assist in steering the aerodyne 1 and, for this purpose, they include ailerons and flaps (not shown) for roll control, as on a conventional aircraft. The wings 3 are foldable such that they can be folded upwards during the take-off and landing phases and when the aircraft is parked on the ground.

In the embodiment shown in FIGS. 1 to 5, each wing 3 is connected to the fuselage 2, at the wing root end 3a of the wing 3, by means of two support arms 2a secured to the fuselage 2, the wing 3 being connected to each of them by a pivot connection with an axis parallel to the longitudinal axis of the fuselage 2. The wing root end 3a of each wing 3 terminates in an end surface 3b whose shape is complementary to the shape of the region 2b of the fuselage 2 opposite which said end surface 3b is located in the unfolded position of the wing 3, in horizontal flight.

Each wing 3 is further equipped with a landing gear 7 positioned at the wing root end 3a, which is preferably retractable inside the wing. The landing gear 7 preferably comprises a motorized wheel. The landing gears 7 thus also enable the aerodyne 1 to move on the ground.

To ensure the stability of the aerodyne 1 on the ground, a retractable rear stand 70 can be fitted to the tail 2c of the aerodyne 1, with a swivel castor 71 preferably attached to the end of the rear stand 70.

Referring in particular to FIG. 6, it can be seen that the folding and unfolding movements of the wings 3 are controlled by a maneuvering cylinder 3c interposed between the fuselage 2 and the end 3a of the wing 3. A connecting rod-crank system may also be used.

The direction and fore-and-aft control means of the aerodyne 1 enable the pilot to control the movement of the aerodyne 1 during the vertical take-off and landing phases, the horizontal flight phases, and the phases when the aerodyne travels on the ground.

These control means can be any appropriate means, such as means that can be operated by a pilot present in the aerodyne, like conventional flight controls of the stick, rudder, throttle lever type, or remote control means enabling the aerodyne 1 to be remotely controlled, or control means capable of enabling the aerodyne 1 to autonomously perform vertical take-off, horizontal flight and vertical landing.

The horizontal flight propulsion means 4 comprise a counter-rotating propeller 8 located at the tail 2c of the aerodyne 1, rotation drive means and means for orienting the counter-rotating propeller 8. The counter-rotating propeller 8 can be oriented, by the control means, about two axes respectively parallel to the yaw axis and the pitch axis of the aerodyne 1.

The counter-rotating propeller 8 is thus used for steering the aerodyne, and the fuselage thereof can have no tail unit. This saves weight and reduces the aerodynamic drag of the aerodyne 1.

The drive means comprise motor means Mm and a drive shaft Am (FIGS. 10 and 13a to 13d) adapted to be driven in rotation by the motor means Mm.

Referring also to FIGS. 7 to 10, it can be seen that the counter-rotating propeller 8 is connected to the drive shaft Am by a pin spherical joint 9, the center of which is the intersection of the longitudinal axis of the drive shaft Am and the axis of rotation of the counter-rotating propeller 8, and the axis of which is the axis of rotation of the counter-rotating propeller 8.

The counter-rotating propeller 8 comprises a first propeller 8a and a second propeller 8b, of which only the hubs are shown in FIGS. 7 to 9.

The first propeller 8a is secured to a first hollow transmission shaft 10 open at both ends. The first propeller 8a is located at a first end 10a of the first transmission shaft 10, a first bevel gear 11 being secured to its other end 10b.

The second propeller 8b is secured to a second transmission shaft 12, which extends through the first transmission shaft 10 and protrudes from each of the two ends 10a, 10b of the latter. The second propeller 8b is located at one end 12a of the second transmission shaft 12, a second bevel gear 13 being secured to its other end 12b.

The pin spherical joint 9 comprises transmission means 14, first orientation means 15 and second orientation means 16.

The transmission means 14 are capable of transmitting the rotation of the drive shaft Am to the first and second bevel gears 11, 13.

The transmission means 14 comprise a bevel gear, called drive gear 17, the axis of rotation of which is perpendicular to the axis of rotation of the first and second bevel gears 11, 13, and the first and second bevel gears 11, 13 mesh with the drive gear 17.

The transmission means 14 also include a bevel ring gear, called drive ring gear 18, which is secured to the drive gear 17, coaxial therewith and of a larger diameter than the latter.

The transmission means 14 also include a bevel gear, called input gear 19, secured to the drive shaft Am and meshing with the drive ring gear 18.

The first orientation means 15 are slaved to the direction and fore-and-aft control means and are used to pivot the counter-rotating propeller 8 about a first pivot axis coinciding with the axis of rotation of the drive gear 17.

The first orientation means 15 comprise a yoke 20, a first trunnion 21 and a first rotary actuator 22.

The yoke 20 is in the form of a casing located between the first and second bevel gears 11, 13 and surrounds the end regions 10b, 12b of the first and second transmission shafts 10, 12. The yoke 20 is connected to the end regions 10b, 12b of the transmission shafts 10, 12 by a pivot connection 23 which allows only the relative rotation between the yoke 20 and the counter-rotating propeller 8 about the axis of rotation of the latter. This pivot connection 23 can be achieved simply by interposing bearings between the yoke 20 and the transmission shafts 10, 12.

The first trunnion 21 is integral with the yoke 20 and extends from one side thereof. The drive gear 17 is rotatably mounted, for example by means of a bearing, around the first trunnion 21, and the longitudinal axis of the first trunnion 21 coincides with the first pivot axis of the counter-rotating propeller 8.

The first rotary actuator 22 is located on the side of the yoke 20 opposite that on which the driving gear 17 is located, and comprises a strain wave reduction gear. The first actuator 22 is connected to the yoke 20 so as to be able to rotate the latter about the axis of the first trunnion 21, and thus to pivot the counter-rotating propeller 8 about the first pivot axis.

The first actuator 22 is slaved to the direction and fore-and-aft control means.

The first orientation means 15, together with the transmission means 14 and the counter-rotating propeller 8, form an assembly called mobile assembly 24.

The second orientation means 16 are slaved to the direction and fore-and-aft control means and are used for rotating the mobile assembly 24 about the axis of rotation of the drive shaft Am.

The second orientation means 16 comprise a mobile frame 25 to which the first trunnion 21 is connected by a pivot connection 26 allowing only the rotation of the bearing 21 about its longitudinal axis. The pivot connection 26 may, for example, use a plain bearing.

The second orientation means 16 further comprise a second axial worm gear actuator 27a, shown schematically, in engagement with a ring gear 28 surrounding the drive shaft Am and secured to the frame 25. The second actuator 27 is thus capable of rotating the frame 25 about the axis of rotation of the drive shaft Am and is slaved to the direction and fore-and-aft control means.

Referring to FIG. 10, it can be seen that, via the direction and fore-and-aft control means, the pilot can control the pivoting of the counter-rotating propeller 8 about a first pivot axis coinciding with the axis of rotation of the drive gear 17 and a second pivot axis coinciding with the axis of rotation of the drive shaft Am, combined pivoting movements thus enabling the counter-rotating propeller 8 to be oriented about two axes, one parallel to the yaw axis and the other parallel to the pitch axis of the aerodyne 1.

It can therefore be understood that, in combination with the ailerons and flaps of the wings 3, the counter-rotating propeller 8 according to the present invention enables the aerodyne 1 to be steered and stabilized during horizontal flight phases, thus dispensing with the need for a tail unit and eliminating the associated aerodynamic friction.

Referring again to FIGS. 1 to 5, it can be seen that the rotors 5 used for vertical take-off and landing are retractable, which also reduces the aerodynamic friction in horizontal flight.

Each rotor 5 is carried by an arm 29 that can be moved between an extended position and a retracted position. In the extended position, rotor 5 is located on one side of fuselage 2, with its axis of rotation being vertical. In the retracted position, the arm 29 and the respective rotor 5 are received in a housing 30 of the fuselage 2. Each arm 29 passes from the housing 30 to the outside of the aerodyne 1 through an opening 30a, 30b made in the fuselage 2 and, when the arms 29 are retracted, the housing 30 is closed by flaps 30c.

According to the present invention, the rotors 5 are associated in pairs and, in the extended position, the two rotors 5 of the same pair are symmetrical relative to the longitudinal axis of the fuselage 2.

In the embodiment shown in FIGS. 1 to 5, the aerodyne 1 comprises two pairs of rotors 5 such that, in the extended position, two rotors 5 are located on either side of the fuselage. Said two rotors 5 on the same side of the fuselage are spaced apart from each other in the longitudinal direction of the fuselage 2. Thus, in this particular embodiment, the aerodyne 1 corresponds to a quadcopter in the take-off and landing phases.

According to a variant of this embodiment shown in FIG. 13d, the aerodyne comprises a single pair of rotors 5, and the counter-rotating propeller 8 is intended to be positioned vertically during the take-off and landing phases, so as to produce upward thrust. Thus, the aerodyne according to this variant corresponds, in the take-off and landing phases, to a tricopter, the rotors 5 being then, preferably, towards the front of the fuselage in the extended position.

Each arm 29 is here a retractable arm capable of sliding along a guide rail 31 located in a housing 30 of the fuselage 2, between the extended position and the retracted position. The guide rails 31 are arranged crosswise at an angle of 45° relative to the longitudinal axis of the fuselage 2.

Referring to FIG. 11, on which only the hub of the rotor 5 is shown, it can be seen more precisely that each retractable arm 29 is a tubular arm 32 whose end opposite that carrying the rotor 5 carries a nut 33 surrounding a motorized screw 34. The motorized screw 34 is hollow and its motorization is located therein. The motorized screw 34 extends along the guide rail 31 and inside the tubular arm 32, so as to control the translation of the tubular arm 32 between the extended and retracted positions. Such motorized screws 34 are known, for example, for motorizing roller shutters.

It should be emphasized here that several guide rails can be arranged for each arm, or a different angle can be used for the arrangement of the guide rails in relation to the longitudinal axis of the fuselage.

Alternatively, the retractable arms 29 can be moved between the extended and retracted positions by means of a rack-and-pinion linkage.

According to another embodiment, the retractable arms 29 can be slidably moved along guide rails, or other translational guide means, between the extended and retracted positions by means of force transmission elements 331. Each force transmission element 331 may, for example, consist of a belt, a single or double toothed belt, a chain or a cable.

FIG. 14 shows an example of this embodiment for four retractable arms 29 arranged crosswise at an angle of 45° relative to the longitudinal axis of the fuselage 2.

According to the example shown in FIG. 14, the aerodyne 1 comprises two motor assemblies 341, two guide assemblies 342, for example pulleys, and two force transmission elements 331. In top view, the motor assemblies 341 and the guide assemblies 342 are each arranged at one of the four corners of a square, two sides of which are parallel to the longitudinal axis of the fuselage 2.

Each force transmission element 331 extends along a diagonal of said square, and is operatively connected to a motor assembly 341 and a guide assembly 342 and so as to form a loop.

It will be understood that, in a direction parallel to the yaw axis of the aerodyne 1, one of the force transmission elements 331 is arranged above the other such that the two force transmission elements 331 are not in contact.

It will also be understood that the motor assemblies 341 and the guide assemblies 342 can be arranged in a different way to that shown in FIG. 14, provided that each motor assembly 341 is diagonally opposed to a guide assembly 342.

Alternatively, the two guide assemblies 342 can also be replaced with two additional motor assemblies 341. In this case, two motor assemblies 341 connected to the same force transmission element 331 are preferably synchronized with each other.

As shown in FIG. 14, each retractable arm 29 is engaged, at the end opposite that carrying the rotor 5, with the force transmission element 331 extending parallel to the direction of movement of said retractable arm 29 between the extended and retracted positions.

It will be understood that a rotation of the motor assemblies 341 in a first direction causes the force transmission elements 331 to move in the first direction and thus causes the retractable arms 29 to slide towards the extended position, and that a rotation of the motor assemblies 341 in a second direction, opposite to the first direction, causes the force transmission elements 331 to move in the second direction and thus causes the retractable arms 29 to slide towards the retracted position.

The force transmission elements 331, the motor assemblies 341 and the guide assemblies 342 are configured and arranged to ensure a sufficient stroke to enable all retractable arms 29 to move from the retracted position to the extended position and vice versa.

As shown in FIG. 15, in order to optimize the stroke, the force transmission elements 331 are preferably toothed belts each comprising at least one external toothing 3311 facing the outside of the loop, and each retractable arm 29 carries a complementary toothing 291 meshing with the external toothing 3311 of the toothed belt.

This configuration makes it possible to exceed the stroke of the toothed belt to obtain a maximum amplitude of movement for each retractable arm 29, and to do away with a "dead" length induced by a rigid connection between a retractable arm 29 and the force transmission element 331, thus making full use of the space available in the housing 30 of the fuselage 2.

It will also be understood that, for two diagonally opposed retractable arms 29, i.e. the left front arm and the right rear arm, and the right front arm and the left rear arm, to be simultaneously moved to the extended position or to the retracted position, said diagonally opposed retractable arms 29 must each be connected to the force transmission element 331 on a respective side of the diagonal, as shown in FIG. 14.

It will also be understood that, for the aerodyne 1 to be balanced, it is preferable to have mirror symmetry, with the plane of symmetry defined by the yaw axis and the roll axis.

According to a variant of this embodiment, the aerodyne may comprise four guide assemblies 342, each arranged at one of the four corners of said square, between which the two force transmission elements 331 extend diagonally, and a single motor assembly 341 arranged in the center of the square and configured to drive the two force transmission elements 331 simultaneously.

According to another variant of this embodiment, in which the retractable arms 29 are not arranged crosswise but are instead moved between the extended and retracted positions in a direction perpendicular to the plane defined by the yaw axis and the roll axis, the combination of a force transmission element 331, a motor assembly 341 and a guide assembly 342 can be used to simultaneously move the two front retractable arms 29 to the extended position or to the retracted position. The same applies to the two rear retractable arms 29.

This latter variant does not ensure mirror symmetry with respect to the plane defined by the yaw and roll axes, but can be implemented for a tricopter-type aerodyne comprising only two retractable arms 29.

It is also emphasized that, alternatively, each arm carrying a rotor can be pivotally mounted between the extended position and the retracted position.

In the embodiment shown, each rotor 5 comprises two counter-rotating single-blade propellers with the same axis of rotation, parallel to the yaw axis of the aerodyne 1, and each propeller is driven in rotation by a dedicated electric motor Mr.

FIG. 12 schematically shows how the rotor propellers can be oriented when the rotors 5 have been received in the housing 30.

On a first side, a first variant is shown, in which the rotors are single-blade propeller rotors, the blades being, in the retracted position, oriented perpendicular to the longitudinal axis of the aerodyne 1. Two openings 30a are then provided, one for each rotor 5, to allow passage of the arms 29 and the rotors 5.

On the other side, another variant is shown, in which the rotors are two-blade propeller rotors, the blades being, in the retracted position, oriented generally parallel to the longitudinal axis of the aerodyne 1. Two openings 30b are again provided, one for each rotor 5, but they are larger than the openings 30a, so as to allow the retraction of a rotor 5 with the blades oriented along the length of the arm 29, and then the rotation of the propeller to place it in the orientation shown.

To control the blade orientation, the motors Mr of the rotors are provided with position sensors to determine the angular position of the propellers.

Reference is now made to FIGS. 13a to 13d, in which alternative embodiments of the motorization of the aerodyne 1 are schematically shown. FIGS. 13a to 13c concern variants for an aerodyne comprising two pairs of rotors 5, and FIG. 13d concerns a variant for an aerodyne comprising a single pair of rotors 5.

For all four variants, the electric motors Mr of the rotors 5 are powered by a common electric generator Ge, driven by a heat engine Mm, Md, located in the fuselage 2, and an electric battery Be and supercapacitors Sc are arranged in series between the electric generator Ge and the electric motors Mr of the rotors 5.

FIG. 13a shows the aerodyne 1 according to the embodiment illustrated in FIGS. 1 to 5. The aerodyne 1 comprises a single heat engine Mm coupled to both the generator Ge and the drive shaft Am. The heat engine Mm is used both for driving the electric generator Ge and for driving in rotation the counter-rotating propeller 8. First and second clutches E1, E2 are interposed between the heat engine Mm and the electric generator Ge, and between the heat engine Mm and the drive shaft Am, respectively.

According to the variants shown in FIGS. 13b and 13c, the electric generator Ge may be driven by a dedicated heat engine Md, and the aerodyne 1 can be clutch-free. The counter-rotating propeller 8 is then driven in rotation by the motor Mm.

More specifically, in the variant shown in FIG. 13b, the motor Mm is coupled to the drive shaft Am and drives the counter-rotating propeller 8 in a similar way to the variant shown in FIG. 13a when the second clutch E2 is engaged, in which case the motor Mm may be a heat engine or an electric motor connected to the electric generator Ge via the electric battery Be and the supercapacitors Sc.

In the variant shown in FIG. 13c, the motor Mm is a counter-rotating electric motor arranged downstream of a three-dimensional orientation device Do, for example of the spherical type, already known per se and which will therefore not be described in greater detail here.

FIG. 13d shows a variant for an aerodyne 1 with a single pair of rotors 5 and a single heat engine Mm, in which case the aerodyne 1 may be free of the second clutch E2.

The various operating phases of the aerodyne 1 are described below.

In the parked state, the aerodyne 1 is carried by the landing gears 7 and the retractable rear stand, which enable it to be moved on the ground, the wings 3 are folded upwards and the arms 29 carrying the rotors 5 are retracted into the fuselage 2.

For the take-off phase, the arms 29 are extended outside the fuselage 2 and the rotors 5 are driven in rotation to allow the aerodyne 1 to rise into the air.

Then, when a sufficient altitude is reached, in a first transition phase, the wings 3 are unfolded, and the horizontal flight propulsion means 4 are activated to enable the aerodyne 1 to move forward. When a sufficient speed has been reached to enable the wings 3 to provide lift for the aerodyne 1 in horizontal flight, the rotors 5 are switched off and the arms 29 are retracted into the fuselage 2.

The aerodyne 1 is then in a horizontal flight phase and able to move like a conventional airplane.

Once it has reached its destination, in a second transition phase, the forward speed of the aerodyne 1 is progressively reduced, then the arms 29 are extended and the rotors 5 are driven in rotation. When the rotors 5 are ready for vertical flight, the horizontal flight propulsion means 4 are switched off and the wings 3 are folded upwards.

Finally, during the landing phase, the aerodyne 1 is gradually returned to the ground. Once the aerodyne 1 is on the ground in the desired position, the rotors 5 are switched off, the arms 29 are retracted into the fuselage 2 and the aerodyne 1 can be moved using the landing gears 7.

For safety reasons, the aerodyne 1 also advantageously comprises person detection means, capable of detecting a person in a danger zone close to the rotors 5, the detection means being capable of issuing alerts and, if necessary, switching off the rotors 5.

Also for safety reasons, the tail 2c of the aerodyne 1 can advantageously comprise, on each side, a flap that can be retracted into the fuselage 2. In the retracted position, the flaps are integrated into the fuselage so as not to create drag, and said flaps are configured to be extended in the event of damage, for example in the event of engine failure, to act as a control surface and make the aerodyne 1 suitable for emergency landing.

More specifically, the fuselage 2 at the tail 2c of the aerodyne 1 comprises substantially flat lateral surfaces receiving the flaps. Each flap is articulated along an axis of rotation parallel to the side surface of the fuselage 2 at the flap, and the two axes of rotation of the two flaps lie in the same horizontal plane.

At the tail 2c of the aerodyne, the fuselage 2 tapers towards the rear, so the axes of rotation of the flaps intersect at a point located to the rear of the aerodyne 1.

In the preferred embodiment of the aerodyne 1, the axes of rotation of the flaps are arranged in the upper part of the fuselage 2, and the flaps open by rotating upwards. Alternatively, an arrangement of the axes of rotation in the lower part and an opening of the flaps by rotation downwards is also possible.

If necessary, the flaps are extended by pivoting around their respective axis of rotation to enable steering. The deployment and the opening angle of the flaps are controlled by actuators that are electrically slaved to the flight controls of the pilot or of the autonomous system.

When the flaps are below, respectively above, the horizontal plane containing the axes of rotation, the flap arrangement creates upward, or respectively downward, thrust on the tail 2c of the aerodyne 1, and thus causes the aerodyne 1 to descend or lift. In the horizontal position, the flaps contribute to the lift of the aerodyne 1 without inducing additional downward or upward thrust.

A change of course is possible by tilting the aerodyne 1 to the desired side using the steering ailerons located in the wings 3 and downward thrust creation at the tail 2c of the aerodyne 1. It is understood that the particular embodiments just described are indicative and non-limiting, and that modifications can be made without departing from the present invention.

The invention claimed is:

1. A vertical take-off and landing aerodyne comprising:
a fuselage;
two wings configured to provide lift in horizontal flight;
a direction and fore-and-aft controller;
a horizontal flight propulsion system comprising
 a counter-rotating propeller disposed at a tail of the aerodyne, and
 a drive system configured to drive the counter-rotating propeller in rotation about an axis of rotation, the counter-rotating propeller being configured to be oriented by the controller about two axes, one of said two axes being parallel to a yaw axis of the aerodyne and the other of said two axes being parallel to a pitch axis of the aerodyne, so that the counter-rotating propeller operates as a steering system configured to steer and stabilize the aerodyne during horizontal flight phases such that the aerodyne has no additional steering system configured to steer or stabilize the aerodyne during the horizontal flight phases at the tail; and
at least one pair of rotors configured to provide propulsion and lift in the take-off and landing phases, the rotors being retractable, each of the rotors being carried by an arm movable between: (i) an extended position, in which the rotor is located on a respective side of the fuselage, with an axis of rotation of the rotor being vertical, two rotors of the same pair of rotors being symmetrical in relation to a longitudinal axis of the fuselage, and (ii) a retracted position, in which the arm and the respective rotor are received in a housing of the fuselage.

2. The aerodyne according to claim 1, wherein the drive system comprises
   a motor, and
   a drive shaft configured to be driven in rotation by the motor, and
   wherein the counter-rotating propeller is connected to the drive shaft by a pin spherical joint, a center of the pin spherical joint being the intersection of a longitudinal axis of the drive shaft and the axis of rotation of the counter-rotating propeller, and an axis of the pin spherical joint being the axis of rotation of the counter-rotating propeller.

3. The aerodyne according to claim 2, wherein the counter-rotating propeller comprises:
   a first propeller secured to a first hollow transmission shaft having two open ends, the first propeller being disposed at one end of the first transmission shaft, a first bevel gear being secured to the other end of the first transmission shaft, and
   a second propeller secured to a second transmission shaft extending through the first transmission shaft and protruding at each of the two ends 4 first transmission shaft, the second propeller being located at one end of the second transmission shaft, a second bevel gear being secured to the other end of the second transmission shaft, and
   wherein the pin spherical joint comprises:
      a transmission system configured to transmit a rotation of the drive shaft to the first and second bevel gears, the transmission system comprising a drive gear, an axis of rotation of the drive gear being perpendicular to an axis of rotation of the first and second bevel gears, the first and second bevel gears meshing with the drive gear;
      a first orientation system configured to pivot the counter-rotating propeller about a first pivot axis coinciding with the axis of rotation of the drive gear, the first orientation system forming, together with said transmission system and the counter-rotating propeller, a mobile assembly; and
      a second orientation system configured to rotate the mobile assembly about the axis of rotation of the drive shaft,
   the first and second orientation systems being slaved to the direction and fore-and-aft controller.

4. The aerodyne according to claim 3, wherein the first orientation system comprises:
   a yoke, which is in the form of a casing located between the first and second bevel gears and surrounding end regions of the first and second transmission shafts, the yoke being connected to said end regions by a pivot connection allowing only a relative rotation between the yoke and the counter-rotating propeller about the axis of rotation of the counter-rotating propeller,
   a first trunnion integral with the yoke, extending from one side of the yoke and around which the first trunnion the drive gear is rotatably mounted, a longitudinal axis of the first trunnion coinciding with the first pivot axis, and
   a first rotary actuator located on the side of the yoke opposite that on which the drive gear is located, the rotary actuator being connected to the yoke so as to be able to rotate the yoke about the longitudinal axis of the first trunnion, and thus to pivot the counter-rotating propeller about the first pivot axis, the first rotary actuator being slaved to the direction and fore-and-aft controller.

5. The aerodyne according to claim 4, wherein the first actuator comprises a strain wave reduction gear.

6. The aerodyne according to claim 4, wherein the transmission system configured to transmit the rotation of the drive shaft to the first and second bevel gears comprises a drive ring gear, which is secured to the drive gear, coaxial therewith and of a larger diameter than the drive gear, and an input gear, which is secured to the drive shaft and meshes with the drive ring gear, and
   wherein the second orientation system comprises
      a mobile frame to which the first trunnion is connected by a pivot connection allowing only a rotation of the trunnion about the longitudinal axis of the trunnion, and
      a second actuator configured to rotate the frame around the axis of rotation of the drive shaft, the second actuator being slaved to the direction and fore-and-aft controller.

7. The aerodyne according to claim 6, wherein the second actuator is an axial worm gear actuator engaged with a ring gear surrounding the drive shaft and secured to the mobile frame.

8. The aerodyne according to claim 1, wherein the at least one pair of rotors comprises a single pair of rotors, the counter-rotating propeller then being intended to be placed, in the take-off and landing phases, vertically so as to produce an upward thrust, the aerodyne then corresponding, in the take-off and landing phases, to a tricopter.

9. The aerodyne according to claim 1, wherein the at least one pair of rotors comprises two pairs of rotors such that, in the extended position, two of the rotors are located on either side of the fuselage, said two rotors being spaced apart from each other in the longitudinal direction of the fuselage, the aerodyne then corresponding, in the take-off and landing phases, to a quadcopter.

10. The aerodyne according to claim 1, wherein each of the arms carrying a respective one of the rotors is configured to pivot between the extended position and the retracted position.

11. The aerodyne according to claim 1, wherein each of the arms carrying a respective one of the rotors is a retractable arm configured to slide between the extended position and the retracted position.

12. The aerodyne according to claim 11, wherein the at least one pair of rotors comprises two pairs of retractable rotors, each of the retractable arms being configured to slide along at least one guide rail disposed in a housing of the fuselage, the guide rails being arranged crosswise.

13. The aerodyne according to claim 11, wherein each of the retractable arms is a tubular arm having two ends, and the end opposite the end carrying the rotor carries a nut surrounding a motorized screw extending along the at least one guide rail and inside the tubular arm, to control translation of the tubular arm between the extended and retracted positions.

14. The aerodyne according to claim 11, wherein each of the retractable arms is engaged, at an end opposite another end carrying the rotor, with a force transmission element, each of the force transmission elements being operatively connected to a motor assembly, an actuation of the motor assembly controlling a movement of the force transmission element and thus the sliding of the retractable arm between the extended and retracted positions.

15. The aerodyne according to claim 14, wherein each of the force transmission elements is a belt carrying on the outside, for each of the retractable arms with which the belt is engaged, an external toothing meshing with a complementary toothing carried by the respective retractable arm, such that the engagement between the retractable arm and the belt is a meshing engagement, two strands of the belt being parallel to the longitudinal direction of the respective retractable arm.

16. The aerodyne according to claim 1, wherein each of the rotors comprises two counter-rotating single-blade propellers having the same axis of rotation, which is parallel to the yaw axis of the aerodyne, each of the propellers being driven in rotation by a dedicated electric motor.

17. The aerodyne according to claim 1, wherein each of the rotors is driven in rotation by a dedicated electric motor carried by the respective arm, the electric motors being powered by a common electric generator located in the fuselage and driven by a heat engine.

18. The aerodyne according to claim 17, wherein the heat engine is dedicated to the generator.

19. The aerodyne according to claim 17, wherein the at least one pair of rotors comprises a single pair of rotors and the heat engine serves both to drive the electric generator and to rotate the counter-rotating propeller, a clutch being interposed between the heat engine and the electric generator.

20. The aerodyne according to claim 1, wherein the wings are foldable, such that the wings are configured to be folded upwards for the take-off and landing phases.

21. The aerodyne according to claim 20, wherein each of the wings is provided with a landing gear, at a wing root end of the respective wing, which is a lower end in the folded position.

22. The aerodyne according to claim 20, wherein each of the wings is connected to the fuselage at a wing root end of the respective wing, the wing root end extending between two support arms secured to the fuselage and being connected to each of the two support arms by a pivot connection having an axis that is parallel to the longitudinal axis of the fuselage, wherein said wing root end terminates in an end surface having a shape that is complementary to a shape of a region of the fuselage opposite which said end surface is located in the unfolded position of the wing, in horizontal flight.

23. The aerodyne according to claim 17, wherein the at least one pair of rotors comprises more than one pair of rotors, and the heat engine serves both to drive the electric generator and to rotate the counter-rotating propeller, a clutch being interposed between the heat engine and the electric generator and between the heat engine and the contra-rotating propeller.

\* \* \* \* \*